June 5, 1928. 1,672,781
C. G. RICHARDSON
CLOTH SHEARING MACHINE
Filed Dec. 15, 1926 2 Sheets-Sheet 1
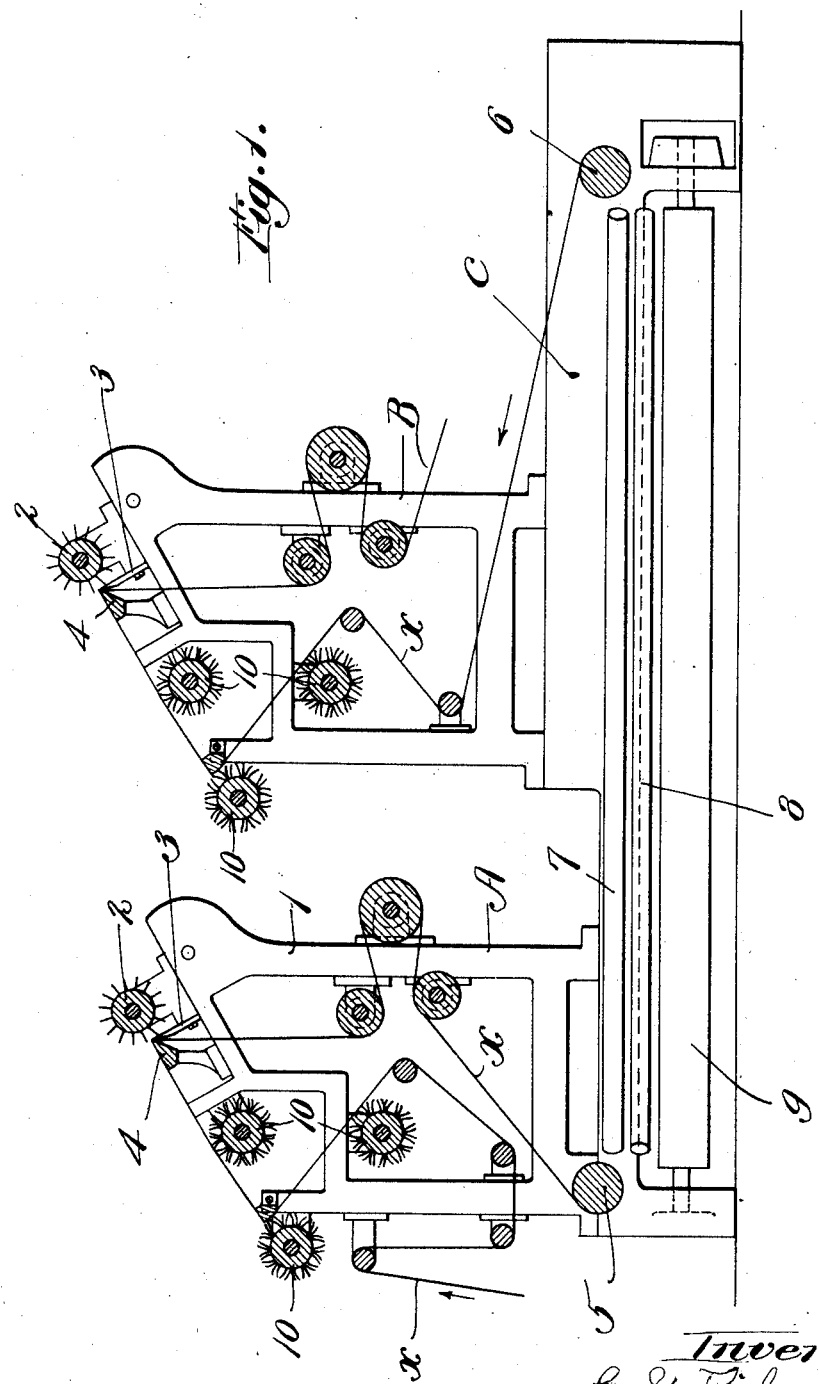

June 5, 1928.　　　　　　　　　　　　　　　　1,672,781
C. G. RICHARDSON
CLOTH SHEARING MACHINE
Filed Dec. 15, 1926　　　2 Sheets-Sheet 2
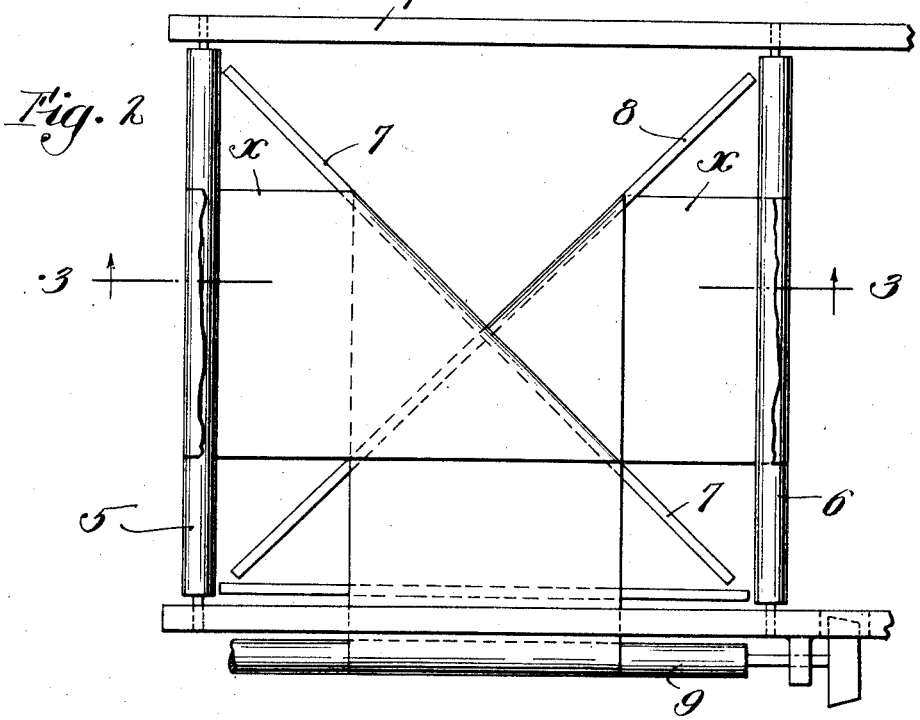
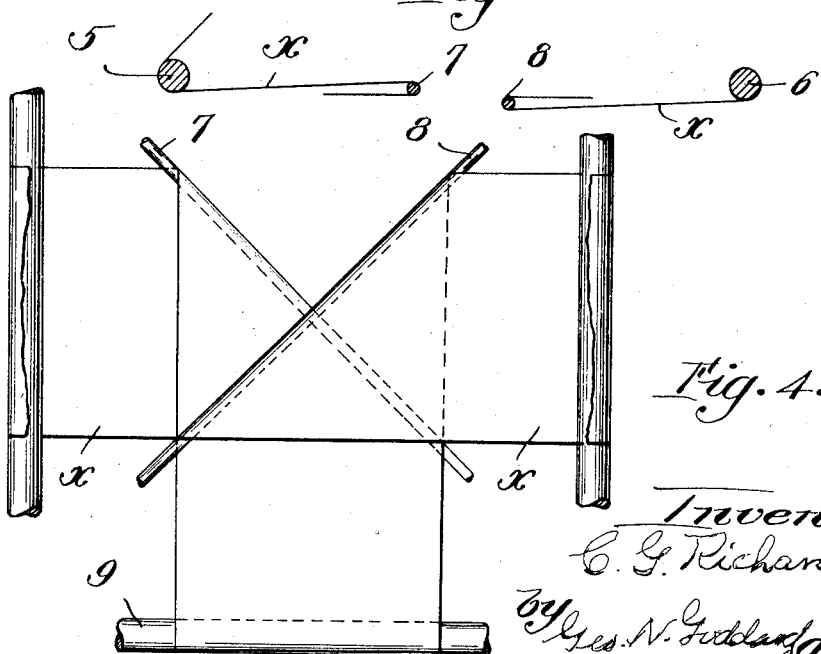
Inventor:
C. G. Richardson
by Geo. N. Goddard atty.

Patented June 5, 1928.

1,672,781

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

CLOTH-SHEARING MACHINE.

Application filed December 15, 1926. Serial No. 154,994.

This invention relates to machines for shearing cloth, and deals particularly with the problem of providing a shearing machine that is readily adapted to shear both sides or faces of the cloth, while at the same time embodying a construction and arrangement that gives to the operator, standing at the front of the machine, a full unobstructed view of each portion or stretch of cloth immediately in front of each fly-blade so that the operator may plainly see the seams or sewings of the ends of the cloth as they approach each line of shearing.

Heretofore it has been proposed to arrange shear units with their two front or intake ends adjacent, with sufficient space between them for the operator to stand during the operation of the machine, but in this position it is difficult for the operator to keep his eyes closely upon the two stretches of cloth in advance of each shearing line as one such stretch is behind him while the other is in front of him. The carrying of the cloth over elevated guide rollers above the shear is objectionable because this stretch of cloth intervenes between one of the shear blades and the operator as to completely conceal the stretch of cloth approaching one of the shear blades, so that the operator can not see the shearings or can not see the formation of wrinkles in the cloth in advance of the shearing line.

The present invention, generally speaking, embraces in combination with plural shear units arranged in tandem relationship, that is, one behind the other, each facing forwardly toward the operator at the front, of special cloth-turning or reversing means arranged below the level of the shearing lines so as to reverse the faces of the cloth as it passes from one shear unit to the next one, while affording no obstruction to the direct vision of the operator to each stretch of cloth immediately approaching the shearing line of each unit, no matter how many units may be employed in the shearing machine. This and other features of the invention will be described in the following specification and will be defined in the claims annexed hereto.

In the accompanying drawings I have illustrated one form embodying the principles of this invention, in which:

Figure 1 is a side elevation in central section showing in a diagrammatic manner the arrangement of plural shear units in combination with a conveniently arranged cloth-turning or reversing device whereby opposite sides of the cloth are subjected to the shearing action of two successive shear units.

Figure 2 is a plan view of that portion of the mechanism which acts to invert or reverse the faces of the cloth as it passes from one unit to the next one.

Figure 3 is a longitudinal section slightly beyond the face of intersection of two diagonal turning rods showing the arrangement in relation to the folds of cloth.

Figure 4 shows a plan view, similar to Figure 2, in which the cloth, instead of passing around each diagonal rod from the top, passes around them from the underside.

In the practice of this invention, according to the form illustrated, I provide any desired number of shearing units, in this case two, A, B, mounted on a longitudinal frame $c$ in tandem arrangment, with their forward ends or front extending in the same direction.

Each shear unit in general comprises a suitable frame in which is mounted, in proper association or relationship, the rotary fly-blade 2, with its co-acting ledger blade 3 set substantially at and tangent to the periphery of the fly-blade and the adjacent cloth-rest 4, around whose edge the cloth passes to subject the nap or pile to the shearing action. Each unit is also provided with suitable guide rolls for guiding the piece of cloth $x$ through the unit to expose the cloth to the shearing elements and to the action of the clearing brushes.

At the outlet part near the bottom of the forward frame A, is mounted a tranverse guide roll 5, and to the rear of the turning mechanism is mounted a parallel guide-roll 6, from which the reversed or inverted cloth passes into the second shear unit B. It will be understood that as many shear units as desired may be assembled in this fashion, but two of them will suffice to illustrate the invention.

Between the outlet guide-roll 5 of one shear unit and the intake roll 6 of the next unit, I locate the means for turning or inverting the cloth, the arrangement preferably being a horizontal one extending beneath the frames so that the cloth will afford no obstruction to complete access to any unit.

The cloth-inverting device in this case comprises a diagonal rod 7, extending at about 45° angle to the transverse axis of the machine, and a similar rod 8, arranged below the level of the turning rod 7, and extending at right angles thereto, the two rods crossing in different planes at substantially their middle points. It is immaterial whether these rods are fixed or rotated, but they will function satisfactorily if mounted as fixed rods in the machine.

The longitudinal roll 9 extends lengthwise of the machine, that is, from front to rear parallel with the side frame opposite the adjacent ends of the two cross-rods 7 and 8.

The line x denotes the line of travel of the cloth through the first shear unit A, under the first guide roll 5, over the top of cross-rod 7 and half way around it so that the cloth passes from the underside around the draft roll 9, whence it is passed back over the top of the second diagonal turning rod 8, making a 90° angular turn around that rod as it did previously around the rod 7, and passing around the second guide-roll 6 into the second shear unit B.

The turning rods or elements 7 and 8 should be of sufficient length to accommodate the widest pieces which the shear is adapted to treat. The cloth, of course, is first drawn through the machine by hand and if desired the ends may be brought together and sewed in order that the cloth may be run through the machine repeatedly for successive shearing operations, space being left between the turning mechanism and the floor for the cloth to return underneath to the forward unit.

It is not essential that the cloth should pass over the top and around the two diagonal rods since it may approach each rod from the underside and leave from the upper side, as shown in Figure 4. In that case, however, the diagonal rod 7 is placed below the diagonal rod 8 instead of above it. With the construction and arrangement shown, in order to secure reversal of the cloth, the cloth must approach the two turning rods from the same side, that is, if it approaches the upper side of the first rod it must also approach the upper side of the second rod.

It will be observed that with this arrangement the cloth is readily inverted to expose its opposite face to the next shear so as to shear both sides, while at the same time the operator has a perfectly unobstructed view of each stretch of cloth in advance of each shearing line of the machine. The machine may be made in very compact form with any number of shearing units desired.

What I claim is:

1. In a machine for shearing both faces of cloth, the combination of plural cloth-shearing units, each embracing a cloth-rest and associated shearing devices, arranged one behind the other with the stretches of cloth approaching each shearing unit from the front, means for reversing the faces of the cloth operatively arranged intermediate of the shearing units below the level of the shearing elements of the units, whereby the cloth passing from one unit is reversed before being sheared by the other unit, leaving an unobstructed view from the front of those parts of the cloth approaching the shearing lines.

2. In a machine for shearing both faces of cloth, the combination of plural shearing units located in tandem arrangement to successively crop the portions of cloth advancing toward them from the front, a cloth-inverting means arranged to receive the cloth passing out of one unit and invert it before it is presented to the shearing action of the next unit, said inverting means embracing diagonal turning bars arranged one across the other in different planes, and an intermediately operative guide member arranged across the ends of said bars.

3. In a cloth shearing machine, the combination of plural shearing units arranged to shear the cloth one after another, a cloth-reversing means embracing a pair of turning bars arranged to cross each other in adjacent planes and an intermediately operative guide roller which receives the cloth from one turning bar and delivers it to the other, said turning bars being located below the level of the shearing lines, thereby affording an unobstructed view of those portions of the cloth approaching each shearing line from the front.

4. In a shearing machine, the combination of plural shearing units arranged in tandem, cloth-reversing means embracing front and rear guide rolls arranged near the bottom of the units across the width of the machine, interposed turning rods extending one across the other at right angles to each other and obliquely of said guide rolls, and an intermediate guiding member extending at right angles to said rolls and arranged to receive the cloth from one turning rod and deliver it to the other around which the cloth passes to the second of said guide rolls with its previous underneath surface exposed from above.

5. In a shearing machine, the combination of two cloth-shearing units, a transverse guide roll for guiding the cloth rearwardly, diagonal crossed rods arranged at substantially right angles in adjacent horizontal planes beneath the machine, a guiding draft roll mounted along one side of the machine across adjacent ends of the cross rods, to receive the cloth from the first turning rod and deliver it to the corresponding side of the second turning rod after the cloth has passed around the first rod.

In witness whereof, I have subscribed the above specification.

CHARLES G. RICHARDSON.